UNITED STATES PATENT OFFICE.

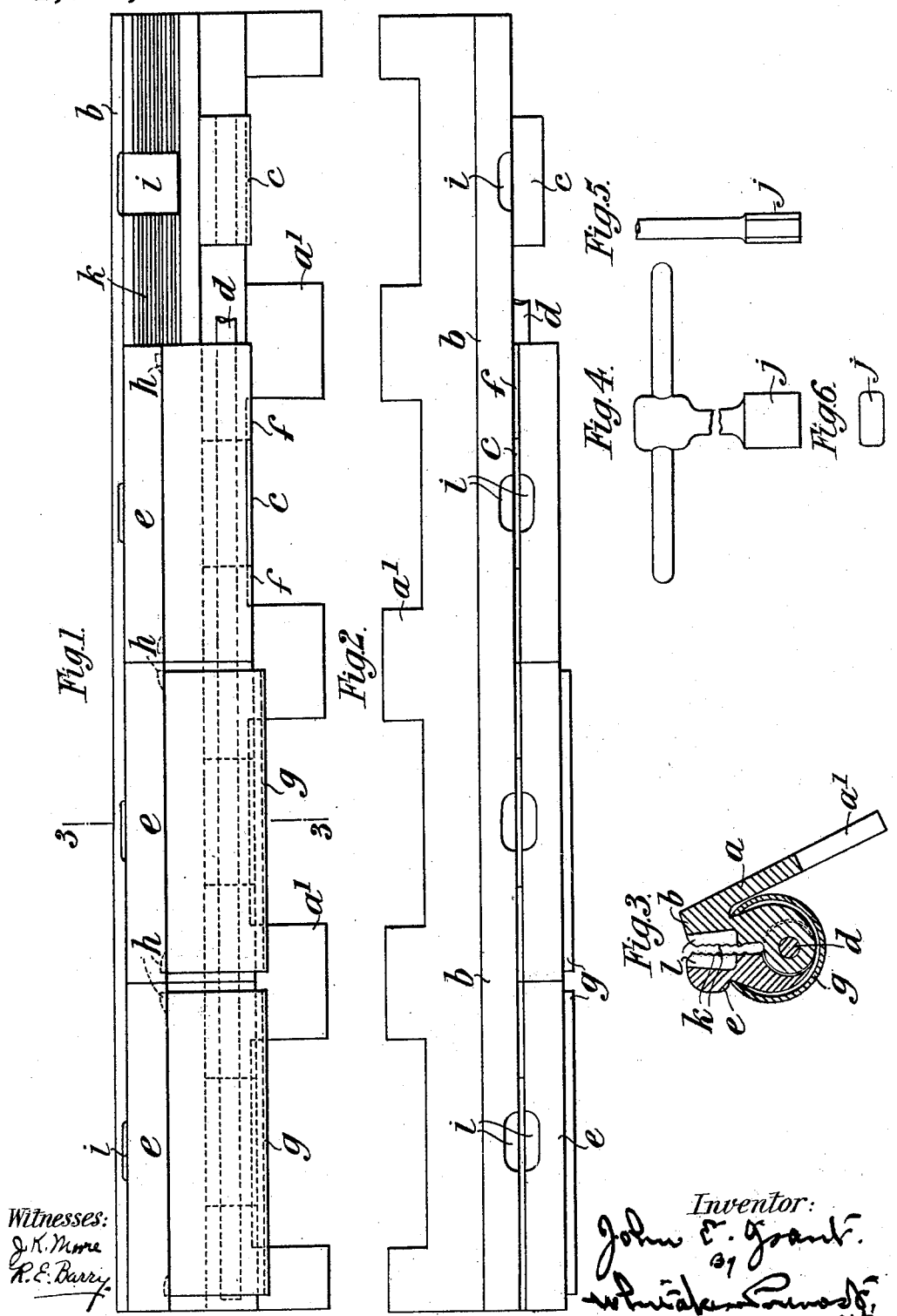
J. E. GRANT.
BRUSH HOLDER FOR DYNAMO ELECTRIC GENERATORS OR ELECTRIC MOTORS.
APPLICATION FILED NOV. 5, 1912.
1,068,335.
Patented July 22, 1913.

JOHN EDWARD GRANT, OF BATTERSEA, LONDON, ENGLAND, ASSIGNOR TO MORGAN CRUCIBLE COMPANY LIMITED, OF LONDON, ENGLAND.

BRUSH-HOLDER FOR DYNAMO-ELECTRIC GENERATORS OR ELECTRIC MOTORS.

1,068,335.  Specification of Letters Patent.  Patented July 22, 1913.

Application filed November 5, 1912. Serial No. 729,599.

*To all whom it may concern:*

Be it known that I, JOHN EDWARD GRANT, a subject of the King of Great Britain, residing at Battersea Works, Battersea, London, England, have invented new and useful Improvements in or Connected with Brush-Holders for Dynamo-Electric Generators or Electric Motors, of which the following is a specification.

This invention relates to brush holders for use in connection with dynamo electric generators or electric motors, and to that class of holder designed for use with carbon brushes and the like, the copper flexibles or pig-tails in connection with which are designed to be fixed to the framing of the holder. In such brush holders, especially when used in conjunction with traction motors the desirability of using copper pig-tails or flexibles has long been recognized as in such motors they are specially required to suppress flashing caused by the vibration of the running vehicle. The risk however, owing to vibration attendant upon the use of screws and other means employed for attaching the flexibles to the framing of the holder, has retarded the adoption of flexibles. Also trouble is experienced in connecting and disconnecting the flexibles, should they become detached owing to vibration, or require renewal, by reason of the difficulty of manipulating the usual binding screws or the like by means of a spanner, screw-driver or other tool in the small space available.

The object of this invention is to provide means whereby the flexibles can be connected with, or disconnected from, the holder with great facility, and to this end the invention consists, mainly, in arranging, in conjunction with the holder, jaws which can be readily opened and closed and in which the ends of the flexibles can be inserted and clamped.

My invention will be readily understood by reference to the accompanying drawing, in which:—

Figure 1 is an elevation with certain parts removed of a spring clipping device provided with four sets of jaws and adapted for use in conjunction with a four link holder. Fig. 2 is a plan of the same, and Fig. 3 is a section on the line 3—3, Fig. 1. Figs. 4, 5 and 6 are views illustrating the construction of the key which is advantageously employed.

$a$ indicates a casting which is secured to the usual holder by means of bolts or the like, passed through lugs $a'$, $a'$ and which has also formed upon it a multiple jaw member $b$ and a series of hinge knuckle sections $c$, $c$ which are drilled to allow of the pin $d$ of the hinge being passed through them.

$e$, $e$ are the movable jaws or members of the clip, which jaws are provided with knuckle sections $f$, $f$ which coöperate with the sections $c$, $c$ and which are movable upon the pin $d$ in the same manner as the leaves of an ordinary hinge.

$g$, $g$ are steel springs, of C-shape in transverse section, which embrace the joints of the clip in a manner which will be readily understood by reference to Fig. 3, the said springs being so shaped and tempered that they will tend to close the jaws together. In practice I find it advantageous to form the ends of the springs with slight projections or horns as indicated at $h$, $h$ the projections being adapted to engage in corresponding recesses either in the casting $a$, or in the jaws $e$, or in both, for the purpose of preventing the said springs from moving laterally with respect to the jaws.

$i$, $i$ are the recesses which are formed between the jaws and which are adapted to receive the bit $j$ of a key, such as that shown in Figs. 4 to 6, so that when the key is inserted into one of the recesses and moved through an angle of 90°, the jaws will be forced apart. As hereinbefore stated, the adjacent faces of the jaws are advantageously serrated or corrugated, as indicated at $k$ in Fig. 3, in order to prevent any possibility of the flexibles escaping from the jaws after they have been clamped therein and for the purpose of improving the electrical contact between the flexible and the jaws.

It is to be understood that my invention is not limited to any special shape of jaw, or to any specific means for operating them, for instance, instead of pivoting the jaws and using springs for causing them to clamp the flexible connections and a key for separating the said jaws, screws, cam or worm gearing may be provided which will serve to positively open or close the jaws. Furthermore the device need not necessarily be made separate and afterward attached to the holder, but may be incorporated so as to be one with the holder.

The invention is very advantageously used in connection with brushes having the flexibles attached thereto without the use of screws or solder in the manner described in the specification of former Letters Patent (of C. D. McCourt,) issued to The Morgan Crucible Co. Ltd., No. 904,077, (Nov. 17, 1908,) and well known as the "Battersea connection." The terminal, which is commonly soldered or otherwise fixed to the other end of the copper flexible or pig-tail is by the present invention rendered unnecessary, the bare flexible being secured directly in the jaws of the clamping device.

Claims.

1. A device for securing flexibles comprising a plurality of jaws, recesses provided in said jaws, and a C-shaped spring for holding the jaws normally in contact, said recesses being adapted to receive a means for opening said jaws to permit the insertion or removal of the flexibles.

2. A device for securing flexibles comprising a plurality of jaws, a plate integral with one of said jaws and adapted to be secured to a desired place, a C-shaped spring for normally holding said jaws in closed position, and recesses provided in said jaws to permit the insertion of a tool for opening said jaws.

JOHN EDWARD GRANT.

Witnesses:
JOHN E. BOUSFIELD,
C. G. REDFERN.